United States Patent Office 3,794,680
Patented Feb. 26, 1974

3,794,680
PREPARATION OF PURE (±)-TRANS-CHRYSANTHEMIC ACID
Masano Matsui, Tokyo, and Kenzo Ueda, Nishinomiya, Japan, assignors to Sumitomo Chemical Company, Ltd., Osaka, Japan
No Drawing. Filed Mar. 16, 1970, Ser. No. 20,088
Claims priority, application Japan, Mar. 22, 1969, 44/21,903
Int. Cl. C07c 61/16
U.S. Cl. 260—514 H    3 Claims

ABSTRACT OF THE DISCLOSURE

A process for obtaining (±)-trans-chrysanthemic acid from a mixture of (±)-trans- and (±)-cis-chrysanthemic acids which comprises treating said mixture in the presence of an acid catalyst under non-aqueous condition. The acid catalyst is Lewis acid such as boron trifluoride, stannic chloride, ferric chloride and zinc chloride, an inorganic acid such as sulfuric acid and phosphoric acid, organic strong acid such as p-toluenesulfonic acid and trifluoroacetic acid, and the like.

---

The present invention relates to preparation of pure (±)-trans-chrysanthemic acid which comprises treating a mixture of (±)-trans- and (±)-cis-chrysanthemic acids in the presence of an acid catalyst under non-aqueous condition.

Chrysanthemic acid is an essential component of esters which are named as so-called pyrethroidal insecticides such as pyrethrin, allethrin, phthalthrin and the like which are useful as an insecticide having low toxicity and rapid effect.

Further, (±)-trans-chrysanthemic acid esters have insecticidal effects higher than those of the corresponding (±)-cis-chrysanthemic acid esters and the (±)-trans-chrysanthemic acid esters have the effects far higher than those of the other corresponding stereoisomeric esters.

Accordingly, it is very important to obtain (±)-trans-chrysanthemic acid from the mixture of (±)-trans- and (±)-cis-chrysanthemic acids which has been synthesized on a commercial scale.

However, it is very difficult to separate the pure (±)-trans-chrysanthemic acid by a simple recrystallization process because the (±)-cis-chrysanthemic acid is less soluble than the (±)-trans-acid in usual solvents.

So far, it is known to separate (±)-trans- chrysanthemic acid from a mixture of (±)-trans- and (±)-cis-chrysanthemic acids by heating said mixture in a large amount of diluted sulfuric acid (Matsui and Miyano: Bulletin of the Agricultural Chemical Society of Japan, vol. 19, page 159 (1955). Said process is, however, carried out in high dilution with troublesome operations such as continuous extraction. More concretely, the mixture of (±)-trans and (±)-cis-chrysanthemic acids is heated in a large amount of diluted sulfuric acid to convert the (±)-trans-acid into (±)-trans - δ - hydroxydihydrochrysanthemic acid, which is easily soluble in water.

Then the reaction mixture is extracted with petroleum ether to remove compounds other than the hydroxy acid.

The aqueous layer is then subjected to continuous extraction with ether to obtain the hydroxy acid. Thus, distillation of ether layer in the presence of p-toluenesulfonic acid gives (±)-trans-chrysanthemic acid.

Moreover, said process is carried out with low yields per volume, because the process cannot be carried out without employing a large amount of diluted sulfuric acid.

The present inventors have completed the present invention to establish a process for separating (±)-trans-chrysanthemic acid in a simple manner and in an almost quantitative yield without any said drawbacks.

The process of the present invention is characterized by treating the mixture of (±)-trans- and (±)-cis- chrysanthemic acids at room temperature or an elevated temperature in the presence of an acid catalyst under non-aqueous conditions to convert (±)-cis-chrysanthemic acid into neutral (±)-dihydrochrysanthemolactone and separating (±)-trans-chrysanthemic acid from the reaction mixture by extraction with an aqueous alkaline solution.

The acid catalyst employed in the present process includes a Lewis acid such as boron trifluoride, stannic chloride, ferric chloride and zinc chloride, an inorganic acid such as sulfuric acid and phosphoric acid, an organic strong acid such as p-toluenesulfonic acid and trifluoroacetic acid, and the like.

The amount of the catalysts employed may be dependent on reaction period of time and kinds of the catalysts. The catalysts may be preferably employed in an amount of between 1 and several tens percent by weight, more preferably 1 to 10% by weight.

In carrying out the present process, it is not always necessary to use a solvent but the present process is preferably conducted in an inert organic solvent such as ether, benzene, toluene and hexane under non-aqueous conditions.

The reaction temperature may be dependent on activity of catalysts employed and reaction periods of time. This reaction may be usually conducted at 10° to 150° C., preferably at 10° to 100° C.

The present invention is illustrated below with reference to examples, but it is needless to say that the present invention is by no means limited only to those examples.

EXAMPLE 1

To a mixture of 10 g. of (±)-trans-chrysanthemic acid and 5 g. of (±)-cis-chrysanthemic acid, 0.4 ml. of boron trifluoride etherate was added and the resulting mixture was stirred under heating for 40 minutes. After cooling, the mixture was dissolved into 50 ml. of benzene, extracted with 5% aqueous sodium hydroxide solution, the extract was washed with a small quantity of benzene and then acidified with hydrochloric acid and extracted 3 times with benzene, the combined extract was dried with anhydrous magnesium sulfate, and the benzene was distilled off to obtain 9.8 g. of light yellow liquid. The obtained liquid readily became crystalline, showed an ultrared absorption spectrum quite same as that of (±)-trans-chrysanthemic acid and showed a melting point of 53° to 54° C. after one recrystallization from petroleum ether.

On the other hand, the neutral benzene portion and the washings were combined together, dried with anhydrous magnesium sulfate and the benzene was distilled off to give 4.9 g. of light yellow liquid. The obtained liquid readily became crystalline, showed a melting point of 51° to 52° C. after one recrystallization from n-hexane and the mixture with (±) - dihydrochrysanthemolactone showed an unchanged melting point.

EXAMPLE 2

10 grams of (±)-trans-chrysanthemic acid and 5 g. of (±)-cis-chrysanthemic acid were mixed together with 50 ml. of benzene and further 0.5 ml. of stannic chloride was added thereto. The resulting mixture was stirred overnight at room temperature. After treating the mixture as in Example 1, 9.9 g. of acid portion having a melting point of 52.5° to 53.5° C. after one recrystallization from petroleum ether and 5.0 g. of neutral portion having a melting point of 50.5° to 52° C. after one recrystallization with n-hexane, were obtained.

EXAMPLE 3

To a mixture of 10 g. of (±)-trans-chrysanthemic acid and 3 g. of (±)-cis-chrysanthemic acid, 50 ml. of benzene and catalytic amount of p-toluene-sulfonic acid were added and the resulting mixture was heated under reflux for 6 hours. After cooling, the mixture was treated as in Example 1 to obtain 10 g. of crystalline acid portion which showed a melting point of 52° to 53.5° C. after one recrystallization from petroluem ether.

On the other hand, 2.7 g. of (±)-dihydrochrysanthemolactone having a melting point of 50.5° to 52° C. after one recrystallization from a n-hexane was obtained from the neutral portion.

EXAMPLE 4

To a mixture of 10 g. of (±)-trans-chrysanthemic acid and 5 g. of (±)-cis-chrysanthemic acid, 50 ml. of benzene and 0.3 ml. of concentrated sulfuric acid were added and the resulting mixture was stirred overnight at room temperature. After treating the mixture as in Example 1, 9.8 g. of crystals was obtained from the acid portion and the crystals showed an ultrared absorption spectrum completely same as that of (±)-trans-chrysanthemic acid and a melting point of 52.5° to 54° C. after one recrystallization from petroleum ether. From the neutral portion, 4.8 g. of crystals having a melting point of 50° to 51° C. after one recrystallization from n-hexane were obtained.

EXAMPLE 5

A mixture of 5 g. of (±)-trans-chrysanthemic acid and 3 g. of (±)-cis-chrysanthemic acid was mixed with 40 ml. of benzene and catalytic amount of ferric chloride and the resulting mixture was heated under reflux for 3 hours. After cooling, the mixture was treated as in Example 1. From the acid portion, 4.9 g. of crystals which showed a melting point of 52° to 54° C. after one recrystallization from petroleum ether and showed an unchanged melting point in the mixture examination with (±)-trans-chrysanthemic acid, was obtained. From the neutral portion, 2.9 g. of crystals having a melting point of 51° to 52° C. after one recrystallization from n-hexane was obtained.

What we claim is:

1. A process for obtaining (±)-trans-chrysanthemic acid from a mixture of (±)-trans- and (±)-cis-chrysanthemic acids which comprises treating the mixture in the presence of a catalyst selected from the group consisting of Lewis acids, strong organic acids and strong inorganic acids under non-aqueous conditions at a temperature of 10° to 150° C., wherein the catalyst is present in an amount between about 1% and several times 10% by weight to convert (±)-cis-chrysanthemic acid into (±)-dihydrochrysanthemolactone, subjecting the reaction mixture to extraction with an aqueous alkaline solution, and recovering (±)-trans-chrysanthemic acid by treating the extract with an acid.

2. A process according to claim 1, wherein the catalyst is boron trifluoride, stannic chloride, ferric chloride, zinc chloride, sulfuric acid, phosphoric acid, p-toluensulfonic acid or trifluoroacetic acid.

3. A process according to claim 1, wherein the treatment of the mixture is conducted in an organic solvent.

References Cited
UNITED STATES PATENTS

| | | | |
|---|---|---|---|
| 3,167,578 | 1/1965 | Fernholz et al. | 210—465.4 |
| 3,527,769 | 9/1970 | Matsui et al. | 210—343.5 |
| 3,538,143 | 11/1970 | Matsui et al. | 260—468 |

OTHER REFERENCES

Julia et al., Bull. Chim. Soc. 1965, 1014 (1965).
Crombie et al., J. Sci. Food Agric. 2 421 (1951).
Eliel, Stereochemistry of Carbon Compounds, pp. 208–9 (1964).

LORRAINE A. WEINBERGER, Primary Examiner

R. GERSTL, Assistant Examiner

U.S. Cl. X.R.

260—343.2 R

UNITED STATES PATENT OFFICE
CERTIFICATE OF CORRECTION

Patent No. 3,794,680   Dated February 26, 1974

Inventor(s) Masanao MATSUI et al

It is certified that error appears in the above-identified patent and that said Letters Patent are hereby corrected as shown below:

The first inventor's first name is misprinted and should be corrected to read --Masanao-- and not "Masano" as appears in Column 1 of the patent.

Signed and sealed this 10th day of September 1974.

(SEAL)
Attest:

McCOY M. GIBSON, JR.
Attesting Officer

C. MARSHALL DANN
Commissioner of Patents